United States Patent [19]

Kamoshita et al.

[11] Patent Number: 4,730,300
[45] Date of Patent: Mar. 8, 1988

[54] DISC CENTERING DEVICE FOR A DISC PLAYBACK DEVICE

[75] Inventors: Yasuhiko Kamoshita; Kazuo Urata; Mikio Ogusu, all of Hamamatsu, Japan

[73] Assignee: Nippon Gakki Seizo Kabushiki Kaisha, Hamamatsu, Japan

[21] Appl. No.: 870,318

[22] Filed: Jun. 3, 1986

[30] Foreign Application Priority Data

Jun. 5, 1985 [JP] Japan .............................. 60-84817[U]

[51] Int. Cl.$^4$ ............................................. G11B 25/04
[52] U.S. Cl. ..................................................... 369/270
[58] Field of Search ........................ 309/269, 270, 271

[56] References Cited

U.S. PATENT DOCUMENTS 4,358,843 11/1982 Rager ................................... 369/270
4,514,839 4/1985 Eisemann ........................... 369/270
4,562,570 12/1985 Denton ............................... 369/270

Primary Examiner—Steven L. Stephan
Attorney, Agent, or Firm—Spensley Horn Jubas & Lubitz

[57] ABSTRACT

In a disc playback device of a type in which a turntable is connected to a disc motor shaft, a disc centering device comprises at least three disc centering members provided in the turntable substantially concentrically with the disc motor shaft and separately moveably in the radial direction of the turntable, the centering members being capable of engaging a central opening of a disc, and urging means provided in the turntable for urging the centering members radially outwardly of the turntable. The centering members engaged in the central opening of the disc work in association with the urging means to position the disc concentrically with the disc motor shaft.

3 Claims, 14 Drawing Figures

DISC CENTERING DEVICE FOR A DISC PLAYBACK DEVICE

BACKGROUND OF THE INVENTION

This invention relates to a disc centering device for centering a disc in order to accurately mount the same on a turntable in a disc playback device.

As is widely known, in a playback device for a disc such as a video disc, a digital audio disc, etc., it is necessary to align the center of a disc with the rotational center of a turntable or with the center of a disc motor shaft when the disc is mounted on the turntable in order to precisely read out recorded signals by a pickup head. There have been proposed devices shown in FIGS. 5 and 6, for example, as the disc playback system with the above mentioned purpose.

In the disc playback device shown in FIG. 5 (proposed by the U.S. Pat. No. 4,340,955), the reference numeral 15 denotes a chassis. A drive motor 16 is fixed on the lower surface of the chassis 15. A shaft 17 of the drive motor 16 projects upwardly from the upper surface of the chassis 15, and a turntable 18 is fixedly mounted on the shaft 17. The turntable 18 comprises a disc mounting member 20 which is provided on a main body 19 at the upper edge thereof, the main body 19 being in the form of a cylinder with a bottom. The shaft 17 is attached with a centering member 22 having a tapered surface 21 on the outer circumference thereof. The centering member 22 is bored with a hole 23 through which the member 22 is mounted on the shaft 17, is guided by the shaft 17 to be freely movable in the vertical direction within a recess 24 of the turntable 18, and is constantly urged upwardly with a spring 25 once the upper limit is determined. In the figure, the reference numberal 26 denotes a disc, and 27 a clamper which clamps the disc 26 on the turntable 18.

In order to mount a disc 26 on the above mentioned device, the central hole of a disc 26 is fitted on the tapered surface 21 of the centering member 22, and the disc 26 is pushed down with the clamper 27 together with the centering member 22, and then is held between the lower portion of the clamper 27 and the disc mounting member 20 of the turntable 18. This type of device can accurately center a disc placed thereon, if the central hole of the disc 26 is uniformly larger or smaller than a reference diameter as the tapered surface 21 of the member 22 is constantly engaged with the central hole of the disc.

In the disc playback device shown in FIG. 6 (proposed by the assignee of this application in the U.S. patent application Ser. No. 665,931), the reference numberal 28 denotes a motor shaft, and 29 a turntable fixed on the motor shaft 29. The turntable 29 is a disc-like member and is formed with an annular center spindle 32 on the main portion 30 thereof. The center spindle 32 defines a tapered surface 31 on the upper surface thereof and is provided with a disc mounting member 34 on the outer side thereof for carrying a disc 33 thereon. The main portion 30 is formed with plural recessed portions 35 (only one of them is shown in the figure) at uniform intervals in the circumference. The recessed portions 35 are so formed as to extend in radial direction and to separate the center spindle 32 at the inner ends thereof. Supporting arms 37 are cantilevered to extend radially inwardly of the main portion 30 within the recessed portions 35. The supporting arms 37 have engagement projections 38 on their ends near the center spindle 32 to protrude upwardly. The engagement projections 38 are tapered upwardly on the upper outer circumference thereof to form a tapered surface 39. The turntable 29 is an integrally molded member made of synthetic resin. The supporting arms 37 can be deflected on the tip ends thereof in the vertical direction as shown with an arrow in the figure. The reference numeral 40 denotes the disc stabilizer which fixes the disc 33 on the turntable 29.

In mounting the disc 33 on the above device, the central hole of the disc 33 is guided by the tapered surface 31 to be fitted on the center spindle 32, and is simultaneously engaged with the tapered surface 39 of the engagement projection 38 formed on the supporting arm 37. Then, the disc stabilizer 40 is pressed onto the upper surface of the disc 33 so as to hold the disc 33 between the stabilizer 40 and the turntable 29. In this type of device, the ends of the supporting arms 37 are deflected downwardly depending upon the diameter of the central hole of the disc 33 so as to cause the tapered surface 39 of the engagement projection 38 to become engaged with the central hole of the disc 33 on the periphery thereof, thereby precisely centering the disc 33.

The disc playback device shown in FIG. 5 is defective, however, in that the turntable 18 and the centering member 22 call for high precision manufacture and therefore push up the cost because these members are fixed and mounted on a common shaft 17 in a movable manner relative to each other. Further, as the disc is centered in this type of device on the surface of the centering member 22 which is uniformly tapered on all the circumference thereof, if irregular fins are formed within the center hole of the disc, precise centering becomes impossible.

The disc playback device shown in FIG. 6 is defective, moreover, in that as a disc is centered by utilizing the flexibility of the supporting arms 37, deformation occurring on the supporting arms 37 due to chronological changes or heat may deteriorate the centering capability. The system is further detrimental in that the radical displacement is limited on the location where the tapered surface 39 abuts onto the disc 33 to thereby offer only a limited centering capability.

In the devices shown in FIGS. 5 and 6, since the portion which mainly centers a disc also acts as the member urging the disc in the upward direction, the disc is applied with a force which works to lift the disc away from the turntable to substantially reduce the clamping force on the disc.

SUMMARY OF THE INVENTION

Accordingly, it is an object of the present invention to provide a disc centering device for a disc playback device which is simple in structure and low in cost.

It is another object of the invention to provide a disc centering device which can perform accurate centering even if irregular fins exist within the central hole of a disc.

It is still another object of the invention to provide a disc centering device which can offer sufficient centering capability and which is not deteriorated in centering capability after an extended use.

It is further object of the invention to provide a disc centering device which does not produce a force which works to lift the disc away from a turntable or which does not reduce a clamping force or the disc.

In order to achieve the above mentioned objects, the device according to the invention comprises at least three disc centering members which are provided on a turntable connected to a disc motor shaft in an arrangement substantially concentric with the disc motor shaft and separately and independently movable in the radial direction, and an urging member which urges each of the centering members in the radially outward direction wherein said centering members are made to engage in the central opening of a disc to position the disc concentrically with the motor shaft.

In the device according to the invention, there is preferably provided guiding means for positioning a disc substantially concentrically with the motor shaft in order to secure the centering of discs. Such means may be provided either by forming a tapered surface positioned on said centering members concentrically with the disc motor shaft, or additionally forming a center spindle member having a tapered surface substantially concentrically with the disc motor shaft on said turntable so that the tapered surface of said centering member and the tapered surface of the center spindle member form, in association with each other, tapered surface in the form of an imaginary cone.

The device according to the invention is simple in structure and low in cost, and even if fins are formed at portions of the central hole of the disc, centering members separately move in compliance with fins and can securely center a disc thereon. And, the device do not deteriorate in centering performance due to extended use or installation environment so long as the urging force of the urging member does not deteriorate, and the device can offer sufficient centering capability. As the disc is not subjected to the force working to lift the disc in the direction away from the turntable, the force for clamping the disc onto the turntable is not reduced.

BRIEF DESCRIPTION OF THE DRAWINGS

In the accompanying drawings, FIGS. 1 through 4 show an embodiment of the device according to this invention in which:

FIG. 1 is a vertical sectional view of essential portions of a disc playback device which is incorporated with the disc centering device according to the invention;

FIG. 2 is a plan view thereof;

FIG. 3 is a plan view of a centering member thereof;

FIG. 4 is a view taken along lines IV—IV in FIG. 3,

FIGS. 7 through 12 show an example of entire construction of a disc playback device to which the present invention is applied in which;

FIG. 7 is a side view of the disc playback;

FIG. 8 is a plan view of the same device;

FIG. 9 is a bottom view of the same device;

FIG. 10 is an exploded view taken along lines V—V in FIG. 9 and

DESCRIPTION OF A PREFERRED EMBODIMENT

FIGS. 1 through 4 are views showing an embodiment of this invention.

The disc playback device described herein is a device for playing back a disc in a state in which it is housed in a disc cartridge case which is loaded in the main body of the device.

Figure 1:
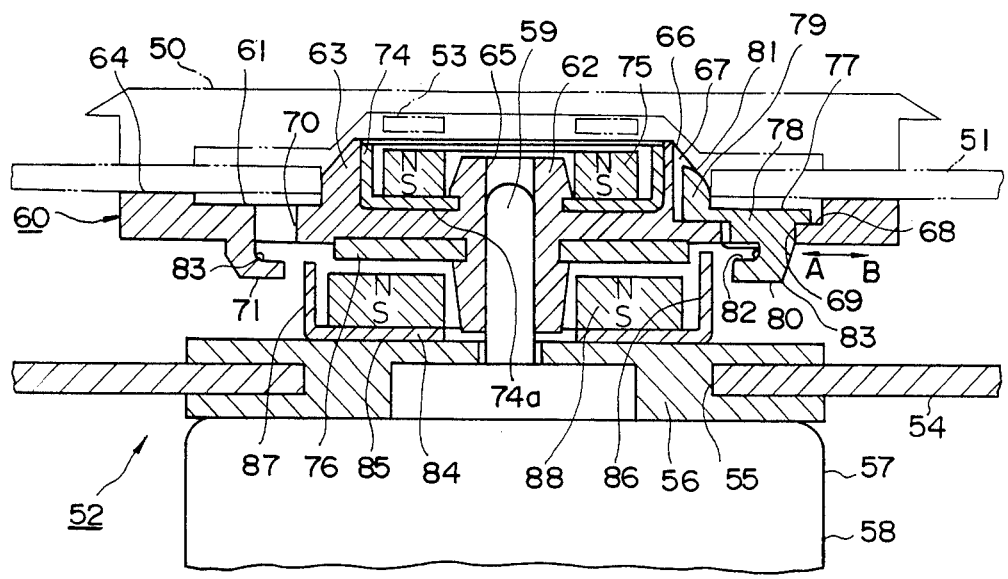
Figure 2:
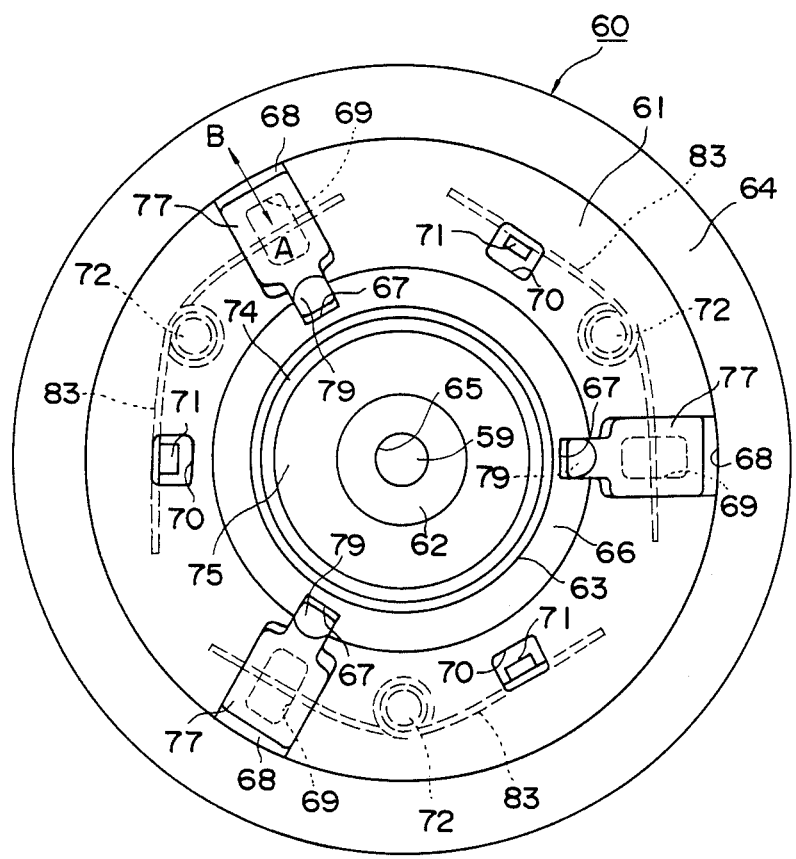

FIGS. 1 and 2 are the views showing essential portions of a disc playback device incorporating the disc centering device of the invention. The reference numeral 50 denotes a disc stabilizer housed inside a disc cartridge case (not shown), 51 a disc housed in the case, and 52 a main body of the device. The entire construction and operation of the disc playback device will be described later with reference to FIGS. 8 through 12.

As shown in the figure, the stabilizer 50 is adapted to cooperate with a turntable 60 when a disc 51 is mounted on the turntable (to the described in further detail hereinbelow) to thereby hold the disc 51 therebetween. A magnetic substance ring 53 is fixed on the bottom thereof.

A chassis 54 of the main body 52 is bored with a hole 55 on which a mounting member 56 is fixed, the member 56 being molded from synthetic resin by outsert forming. The main body 58 of the motor 57 is fixed on the lower surface of the mounting member 56, and the turntable 60 is connected to a rotation shaft 59 (disc motor shaft) projecting from the upper surface of the mounting member 56.

The turntable 60 is an integrally molded member of synthetic resin and is shaped generally as a disc as shown in the figure. A main portion 61 of the turntable 60 is formed with a mounting portion 62 which projects vertically at the center of the main portion 61. A center spindle 63 is formed on the upper surface of the mounting portion 62 and radially outwardly of the mounting portion 62, and a disc mounting member 64 is formed on the upper surface of the mounting portion 62 but further radially outwardly. The mounting portion 62 is a cylindrical wall the inner surface of which defines a mounting hole 65 for mounting the shaft 59 thereto. The center spindle 63 is a cylindrical wall portion the axis of which is aligned with the axis of the mounting hole 65, and is tapered upwardly on the upper peripheral surface thereof to form a tapered surface 66. On the center spindle 63 are formed three notches 67, 67, 67 on the outer surface thereof at uniform intervals circumferentially. A disc mounting portion 64 is an annular wall projecting slightly upward from the main portion 61 at the periphery thereof. The upper surface of the main portion 61 is formed with three recesses 68, 68, 68 arranged circumferentially at uniform intervals concentrically with the shaft 59 which is fixed on the mounting hole 65. The recess 68 extends into the inside of the center spindle 63 at one end to communicate with the notch 67. In the main portion 61 are formed holes 69, 69, 69 within said recesses 68, 68, 68, while in the intermediate portions thereof between adjacent recesses 68, 68 are formed holes 70, 70, 70, and the outer peripheries of the holes 70 are formed with engagement wall portions 71, 71, 71 which project downwardly. The main portion 61 is formed with shaft members 72, 72, 72 on the lower surfaces thereof to project downwardly between the hole 69 and the engagement wall portion 71.

A yoke 74 of magnetic substance in the form of a cylinder having a bottom is fixed in an annular recess formed between the mounting portion 62 and the center spindle 63 through the insert forming of the turntable 60. A magnet ring 75 is fixed with an adhesive onto the upper surface of the bottom 74a of the yoke 74. A magnetic plate 76 of magentic substance is fixed on the bottom of the main portion 61 at the center thereof also through the insert forming of the turntable 60.

Figures 3, 4:
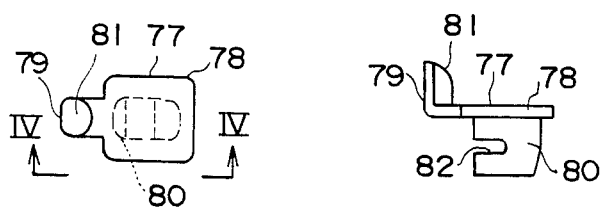

Disc centering members 77, 77, 77 are provided within the recesses 68, 68, 68 of the turntable 60. As shown in FIGS. 3 and 4, the centering member 77 defines an upwardly projecting engagement wall 79 (tapered portion) on the end surface of a plate-like main portion 78 and a downwardly projecting spring engaging portion 80 on the lower surface of the main portion 78. The upper end portion of the engagement wall 79 defines a tapered surface 81 which is inclined in the same direction as the tapered surface of the center spindle 63 when the centering member 77 is mounted on the turntable 60. The spring engaging portion 80 is provided with a spring engaging groove 82. The centering member 77 is mounted in the turntable 60 in such a manner that the main portion 78 is positioned in the recess 68, the engagement wall 79 in the notch 67, and the spring engaging portion 80 projects downwardly through the hole 69 to reach below the main portion 61. Three centering members 77, 77, 77 are positioned substantially concentric with and around the rotation shaft 59 due to the positional relation with the recesses 68, 68, 68, and can be moved respectively within a predetermined scope in the radial direction of the turntable 60 (the direction marked with the arrows A, B). The extent in which the centering member 77 can move is the scope which allows the movement of the tapered surface 81 and the outer surface of the engagement wall 79 from inside of the notch 67 of the center spindle 63 to a predetermined position outwardly of the notch 67.

The shaft members 72, 72, 72 on the lower surface of the turntable 60 are wound with a spring 83 (urging member) respectively for urging the centering members. Each spring 83 is engaged in the spring engaging groove 82 on one end thereof and with the engagement wall portion 71 on the other end. Consequently the centering members 77 are constantly urged radially outwardly while the tapered surface 81 and outer surface of the engagement wall 79 are positioned to slightly project outward from the tapered surface 66 and the outer surface of the center spindle 63 respectively. Under such conditions, the tapered surface 66 of the center spindle 63 and the tapered surfaces 81, 81, 81 of the centering members 77, 77, 77 are circumferentially arranged to form an imaginary cone with the shaft 59 constituting the central axis thereof.

A yoke plate 84 made of magnetic substance is fixed on the upper surface of the mounting member 56. The yoke plate 84 comprises three projecting yoke numbers 86, 87, 87 which project from the peripheral portion of a disc-like main portion 85 (one of the two projecting yoke members 87, 87 is shown in FIG. 1). The projecting yoke member 86 is higher than the projecting yoke members 87 so that the upper end of the members 87 are positioned obliquely downwardly of the outer peripheral surface of the magnetic plate 76 while the upper end of the member 86 is positioned on the lateral side of the magnetic plate 76. On the upper surface of the main wall portion of the yoke plate 84 is fixed a magnet ring 88 with an adhesive to oppose the magnetic plate 76.

A disc is mounted in the disc playback device having the aforementioned structure in the following manner. For mounting the disc 51 on the turntable 60, the disc cartridge case housing the disc 51 is brought above the turntable 60 and lowered toward it. When the disc cartridge case is placed on the turntable 60, the turntable 60 enters an insertion hole (not shown) in the case to cause the center spindle 63 of the turntable 60 to enter the center hole of the disc 51 so as to mount the disc 51 on the disc mounting portion 64 of the turntable 60. The disc stabilizer 50 situated above the upper surface of the disc 51 pushes the disc 51 downwardly as the magnetic substance ring 53 fixed on the lower surface thereof is attracted toward the magnet ring 75 and the yoke 74. The disc 51 is consequently held between the turntable 60 and the disc stabilizer 50.

In such an operation, even if the center of the disc 51 is deviated slightly from the center of the turntable 60 when the center spindle 63 is being advanced into the center hole of the disc 51, as the center spindle 63 defines a tapered surface 66 on the upper peripheral portion thereof, the tapered surface 66 guides the disc 51 to facilitate smooth advance of the center spindle 63 into the hole at the center of the disc 51. In the above operation, when the disc 51 is lowered by a predetermined distance being guided by the tapered surface 66, the center hole thereof fits with the tapered surface 81 of the centering members 77 to cause the centering members 77 to move radially inwardly against the force of the spring 83 (i.e. in the direction marked with an arrow A). As the tapered surface 66 of the center spindle 63 and the tapered surfaces 81 of the centering members 77 form an imaginary cone-like surface with the shaft 59 constituting the central axis, these tapered surfaces act as guiding means to direct the center of the disc 51 to align with the position of the turntable 60. Then, the center spindle 63 and the disc centering member 77 further advance into the central hole of the disc 51 to finally mount the disc 51 on the upper surface of the disc mounting portion 64 to complete the mounting.

As the centering member 77 which centers the disc 51 together with the center spindle 63 is constantly urged radially outwardly (the direction marked with an arrow B) with the spring 83, even if the dimensions of the central hole of the disc vary from one disc to another, the engagement wall 79 constantly complies with the periphery of the central hole of the disc 51 thereby centering the same.

As the three centering members 77 can be moved separately and independently in radial direction even if there are some fins on the edge of the hole of the disc 51, the centering member which abuts on the fins moves radially inwardly by greater distance to secure accurate centering of the disc 51.

Figure 5:
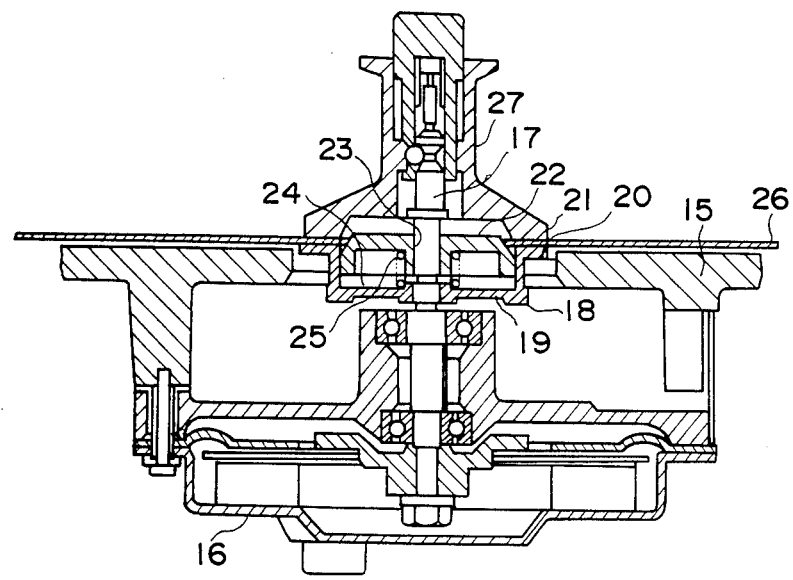
FIGS. 5 and 6 are vertical sectional views of essential portions of prior art disc playback devices with disc centering faculty.
Figure 6:
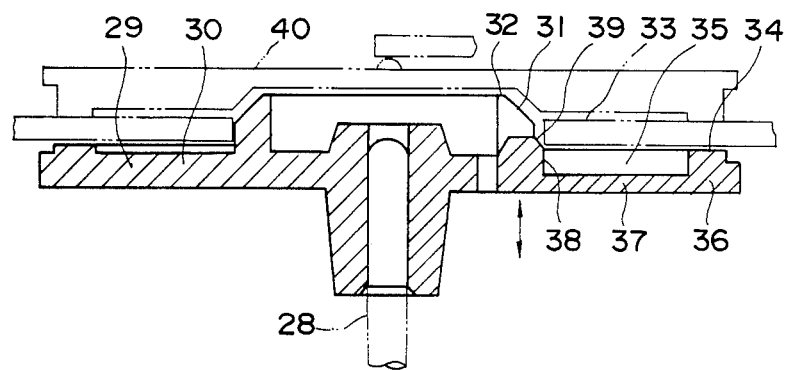

As the centering member 77 holds the disc 51 in a substantially concentric relation with the rotation shaft 59 by urging the disc 51 in the radial direction, the disc 51 is not urged upwardly when it is being mounted as is in the prior art device shown in FIGS. 5 and 6. The force clamping the disc 51 between the disc stabilizer 50 and the turntable 60 is therefore not reduced.

In device according to the invention, as the magnet ring 88 and projecting yoke members 86, 87, 87 attract the magnetic plate 76 downwardly and the projecting yoke member 86 attracts the magnetic plate 76 in one lateral direction, the rotation shaft 59 of the motor 57 is urged downwardly as well as in one lateral direction to prevent vibration of the shaft.

As the disc 51 is mounted on the turntable 60 in the above mentioned manner, when the motor 57 is actuated, signals recorded on the disc 51 can be reproduced by a pickup head (not shown).

Although the number of the centering members 77, 77, 77 provided on the turntable 60 is three in the above embodiment, it may be more than three.

For better understanding of the invention, the entire construction of the disc playback device will be described hereinbelow with reference to FIGS. 7 through 12. It should be noted that this entire construction is disclosed also in copending U.S. patent application Ser. Nos. 781,768, 781,751 and 813,533 by the same assignee.

FIGS. 7 through 12 show an example of the disc playback device in the form of a Compact Disc Player.

The disc playback device (Compact Disc Player) to be described below comprises a disc cartridge case C housing a disc (Compact Disc) and a main body D. The disc is housed in the disc cartridge case C and this disc cartridge case C is loaded in the main body D and the disc is played back in a state in which it is housed in the disc cartridge case C.

Figure 7:
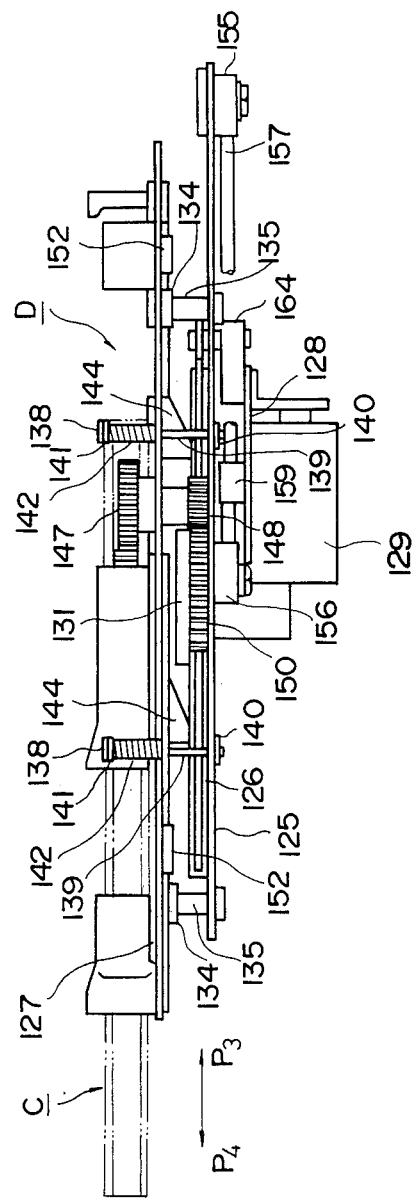

The disc cartridge case C houses a disc 121 rotatably therein. As shown in FIGS. 7 and 12, a rack 122 is provided on one side of the disc cartridge case C for loading the case C in the main body D and a disc stabilizer 124 is provided undetachably on the upper surface of the inside of the case C for rotatably holding the disc 121.

The construction of the main body D will now be described. Referring to FIGS. 7 through 10, above a chassis 125 there are provided a carrier 126 and a holder 127 and below the chassis 125, there is provided an optical pickup head 129.

Figure 8:
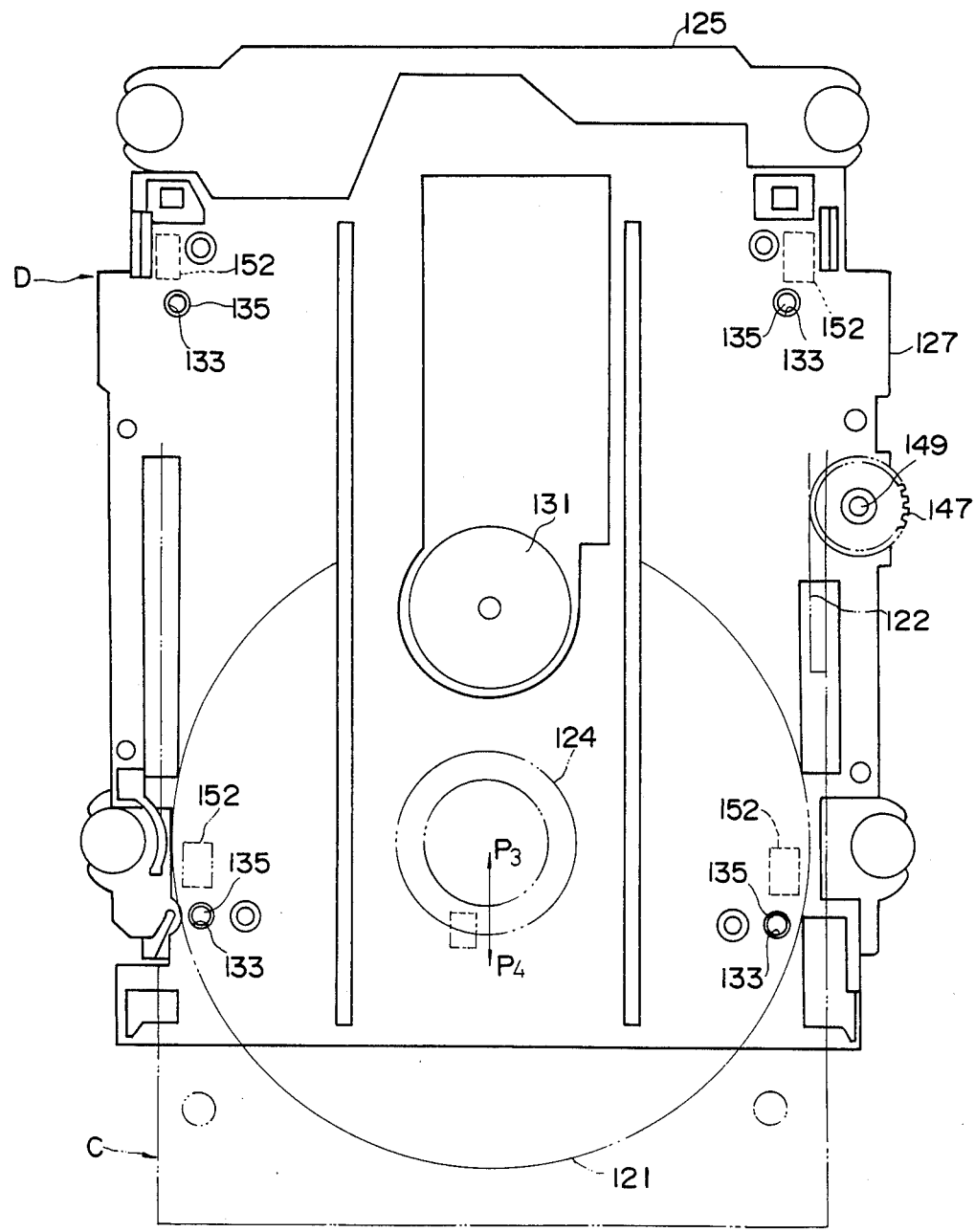
Figure 10:
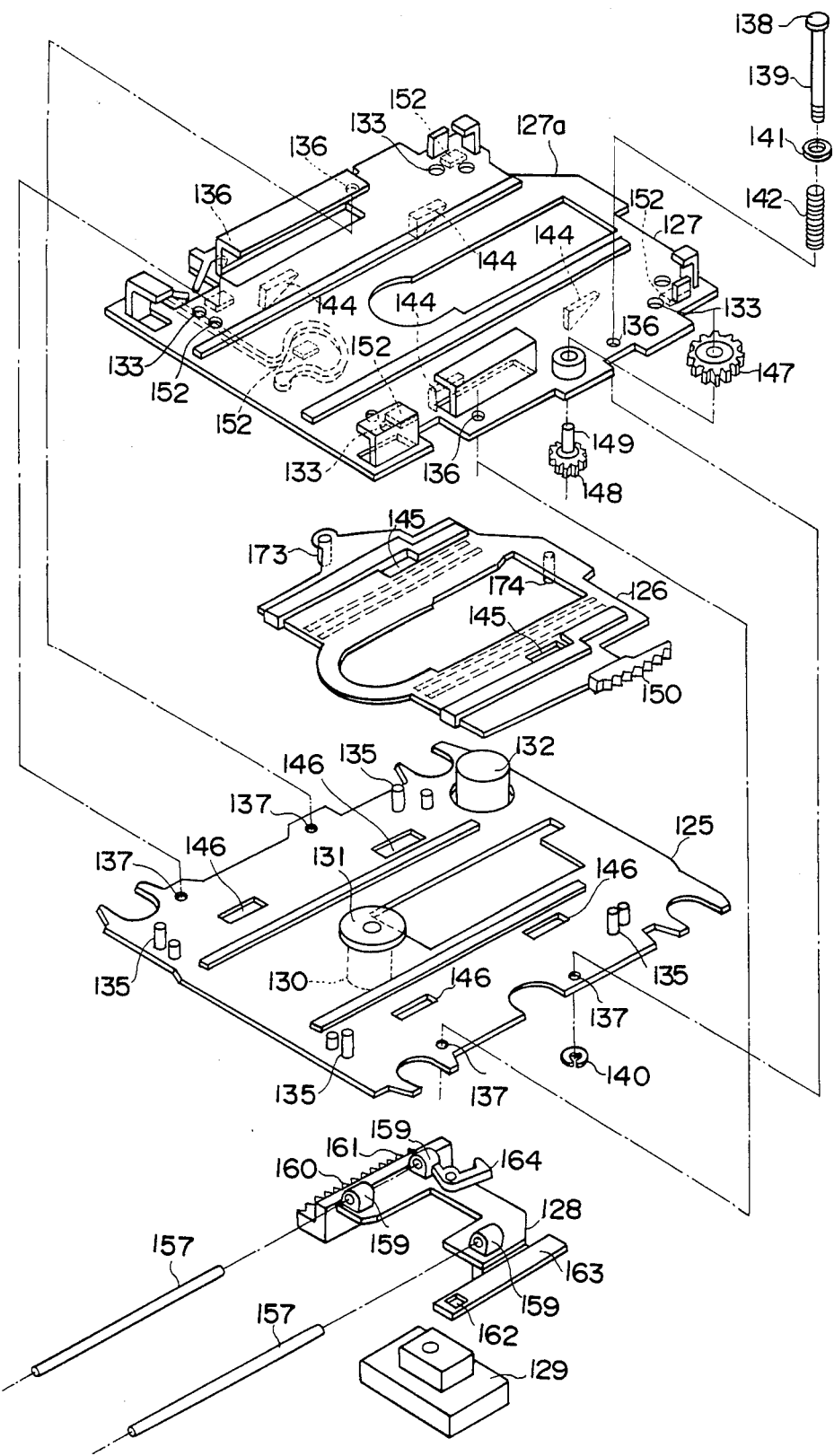

A disc driving motor 130 is mounted on the lower surface of the chassis 125 and a turntable 131 is mounted on the rotation shaft of this motor 130 projecting upwardly through the chassis 125. On this turntable 131 is attached a magnetic substance or a magnet (not shown) which is attracted to a magnet or a magnetic substance (not shown) attached to the disc stabilizer 124 when the disc 121 has been mounted on the turntable 131, as will be described more fully later. A feed loading motor 132 is secured to one end portion of the chassis 125 in such a manner that its rotation shaft is projecting downwardly. The carrier 126 is disposed on the upper surface of chassis 125 and is movable in directions of arrows P3 and P4. The holder 127 is disposed above the upper surface of the chassis 125 with the carrier 126 disposed therebetween and is vertically movable relative to the chassis 125. The holder 127 is formed in the respective corners thereof with guide members 134, 134 . . . having location pin guide openings 133, 133 . . . as shown in FIGS. 7, 8 and 10 by the outsert forming. Location pins 135, 135 . . . are fixedly secured to the respective corners of the chassis 125 with their upper end portions being inserted in the location pin guide openings 133, 133 . . . . Owing to this structure, the holder 127 moves vertically along the location pins 135, 135 . . . . The holder 127 is formed in its side edge portions with openings 136, 136 whereas the chassis 125 is formed in locations corresponding to these openings 136, 136 . . . with openings 137, 137 . . . . Pins 139 having head portions 138 are inserted through the corresponding openings 136, 136 . . . and 137, 137 . . . . Retainers 140 are attached to the end portions of these pins 139, 139 . . . projecting downwardly from the chassis 125 and washers 141 engaging with the head portions 138 are attached to the end portions of these pins 139, 139 . . . projecting upwardly from the chassis 125. Coil springs 142 are provided between the washers 141 and the holder 127, urging the holder 127 downwardly. The holder 127 is in its uppermost position when cams 144, 144 . . . formed on the lower surface of the holder 127 are in abutting engagement with the upper surface of the carrier 126 and is moved downwardly by the urging force of the coil springs 142, 142 . . . when the cams 144, 144 . . . have entered openings 145, 145 . . . formed in the carrier 126 and openings 146, 146 . . . formed in the chassis 125. A shaft 149 to which a loading pinion 147 and a carrier pinion 148 are fixedly secured is rotatably supported on the holder 127. The carrier pinion 148 is in mesh with a rack 150 provided on the carrier 126.

In the above described construction, when the head base 128 has been moved as will be described later, the carrier 126 is moved in association with this head base 128 in the directions of arrows P3 and P4 thereby causing the holder 127 to be moved upwardly and downwardly and the loading pinion 147 to be rotated. During the playback of the disc 121, the holder 127 holds the disc cartridge case C housing the disc 121 and places the disc 121 on the turntable 131. During loading and ejecting of the disc cartridge case C, the loading pinion 147 meshes with the rack 122 of the disc cartridge case C and thereby moves the disc cartridge case C in the directions of arrows P3 and P4.

The chassis 125 and the holder 127 are formed by cutting steel plates which are magnetic substance to predetermined shapes.

Magnetic attraction generating means is provided on the chassis 125 and the holder 127 for clamping the holder 127 in position in association with the coil springs 142, 142 . . . when the holder 127 holding the disc cartridge case C has been moved downwardly to a position in which the holder 127 enables the disc 121 to be played back. More specifically, magnets 152, 152 . . . in the form of an oblong plates are bonded by adhesive on the lower surface of the holder 127 in respective corners and in the front end portion. Each of the magnets 152 is magnetized so that it has poles in the upper and lower end portions thereof. The portions of the chassis 125 opposing these magnets 152, 152 . . . are formed in flat surfaces so that these portions of the chassis 125 are attractable to the magnets 152, 152 . . . . When the holder 127 is in the lowermost position, flux of each of the magnets 152 passes from the magnet 152 to the chassis 125 through the holder 127 and returns from the chassis 125 to the magnet 152. By the formation of this magnetic circuit, the magnets 152 attract the chassis 125 thereby clamping the holder 127 in position securely and preventing an undesired vertical movement of the holder 127. In this lowermost position of the holder 127, a small gap l is defined between the magnets 152 and the chassis 125 so as to enable the holder 127 to move easily when it is displaced from the chassis 125.

Figures 9, 11:
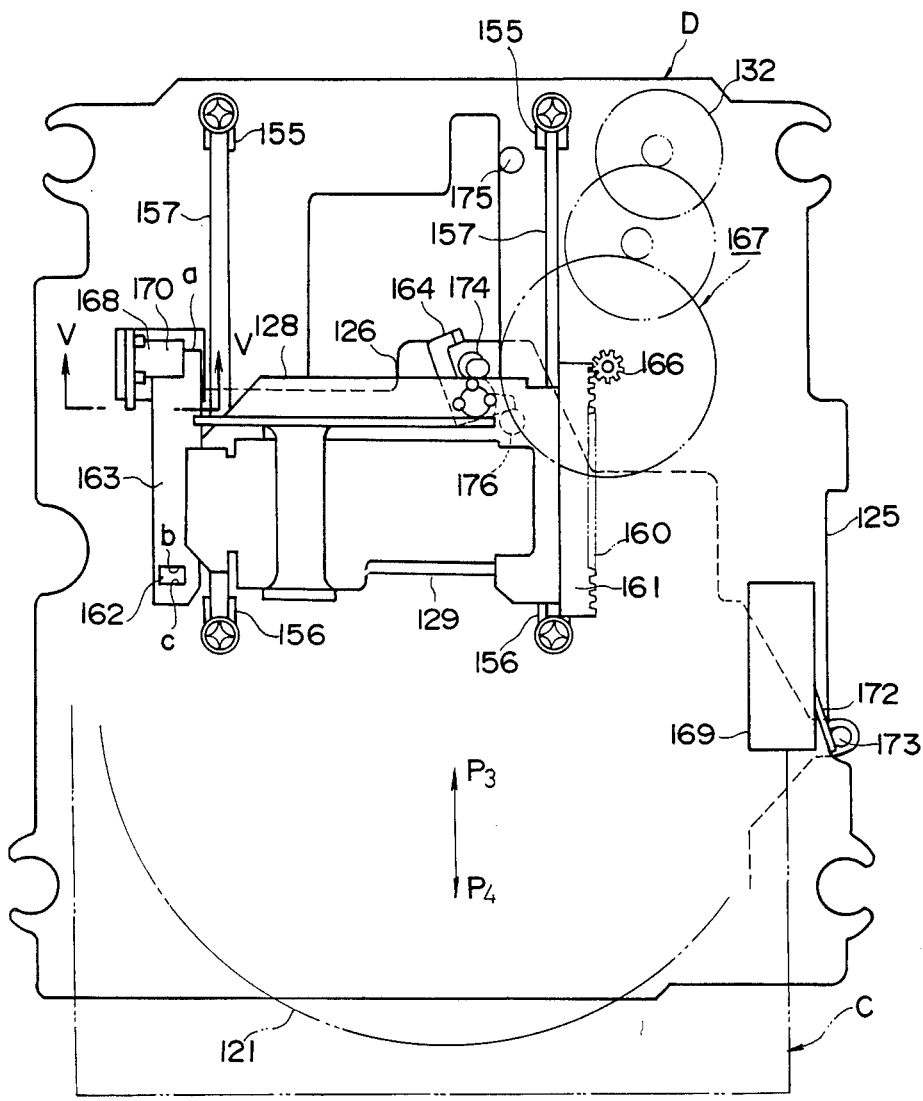

As shown in FIGS. 7 and 9, guide bar mounting blocks 155, 155, 156, 156 are provided on the lower surface of the chassis 125 and guide bars 157, 157 are mounted between the guide bar mounting blocks 155 and 156 in a direction parallel to the directions of arrows P3 and P4. The head base 128 is mounted on the guide bars movably in the directions of arrows P3 and P4. As shown in FIGS. 9 and 10, the head base 128 is provided in its left and right upper surface portions with mounting blocks 159, 159, 159, in its one side portion with a member 161 having a feed loading rack 160, in its other side portion with a slit plate 163 having an opening 162, in one end portion of its upper surface with an engaging hook 164 and in its central portion with the pickup head 129. On the lower surface of the chassis 125, there are provided a feed loading pinion 166 which meshes with the feed loading rack 160 of the head base 128, a gear train 167 for transmitting the rotation of the feed loading motor 132 to the pinion 166, a photo-coupler 168 for detecting the position of the head base 128 and a microswitch 169 for detecting insertion of the disc cartridge case C in the holder 127. The photo-coupler 168 is disposed in such a manner that, as shown in FIGS. 9 and 11, its light-emitting section 170 and its light-receiving section 171 are opposed to each other with the slit plate 163 being interposed therebetween. This photo-coupler 168 detects the position of the head base 128 by detecting passing or interruption of light between the light-emitting section 170 and the light-receiving section 171 when the rear edge a of the slit plate 163 and edges b and c of the opening 162 have been moved to the space between these sections 170 and 171. The photo-coupler 168 thereby detects the lead-in and lead-out positions of the disc 121, completion of the loading operation and completion of the overstroke movement of the head base 28 to be described later. The microswitch 169 is so constructed that its actuator 172 abuts against a pin 173 provided on the carrier 126 and detects disengagement of the pin 173 from the actuator 172 thereby detecting the insertion of the disc cartridge case C in the holder 127.

In the above described construction, when the feed loading pinion 166 is driven and rotated, the head base 128 whose rack 160 is in mesh with the pinion 166 is moved in the directions of P3 and P4 and the optical pickup head 129 thereby is moved in the diametrical direction of the disc 121 in a region beneath the disc 121 placed on the turntable 131. At this time, the carrier 126 is moved in the direction of arrow P3 or P4 by abutting engagement of a carrier pin 174 fixedly secured on the carrier 126 with the head base 128 or engagement of the carrier pin 174 with the engaging hook 164. When the head base 128 has been moved in the direction of arrow P3 or P4, an end portion of the engaging hook 164 is engaged with a pin 175 or 176 fixedly secured on the chassis 125 in the end sections of the movements of the head base 128 and the engaging hook thereby is rotated into engagement with or disengagement from the carrier pin 174.

The operation of the disc playback device during playback of the disc will now be described.

Figure 12A:
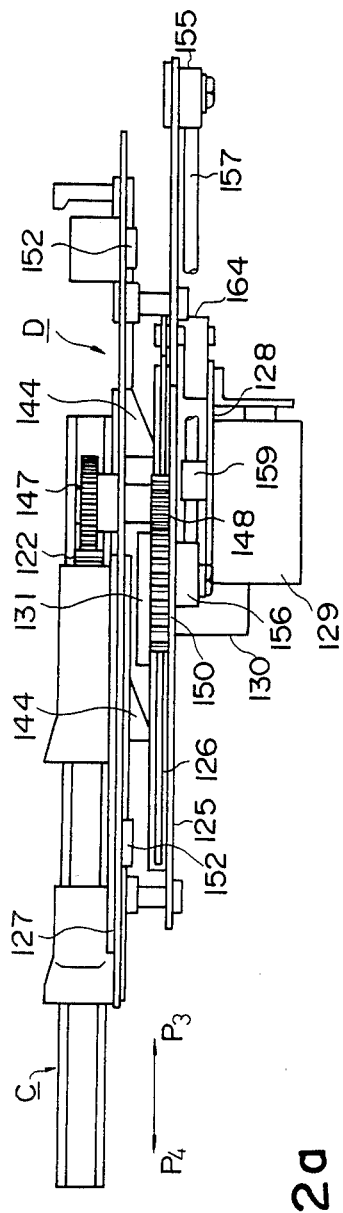
FIGS. 12a, 12b and 12c are side views of the same device illustrating different states of operation of the device.

In a standby state before the disc cartridge case C is inserted, the main body D is in a state shwon in FIG. 12a in which the carrier 126 has moved in the direction of arrow P4 and the holder 127 is in its uppermost position (the non-playback position of the disc 121) with the lower edges of the cams 144, 144 ... being in abutting engagement with the upper surface of the carrier 126. The head base 128 also is in a position in which it has moved to the direction of arrow P4. The pin 173 of the carrier 126 is in abutting engagement with the actuator 172 of the microswitch 169. The carrier pinion 148 is in mesh with the rack 150.

For playing back the disc 121, the disc 121 is loaded in the disc cartridge case C and this disc cartridge case C is manually inserted into the holder 127 of the main body D. In this manual operation, the disc cartridge case C is inserted in the direction of arrow P3 as shown in FIG. 12a to a position in which the foremost end portion of the rack 122 of the case C comes into meshing engagement with the loading pinion 147 and this loading pinion 147 thereby is slightly rotated. The slight rotation of the loading pinion 147 is transmitted to the carrier pinion 148 through the shaft 149 and the rack 150 which is in mesh with the carrier pinion 148 is moved in the direction of arrow P3 thereby causing the carrier 126 to be moved by a small distance in the same direction. This movement of the carrier 126 causes the pin 173 to be disengaged from the actuator 172 of the microswitch 169 shown in FIG. 9 whereby the microswitch 169 is turned on.

Figure 12B:
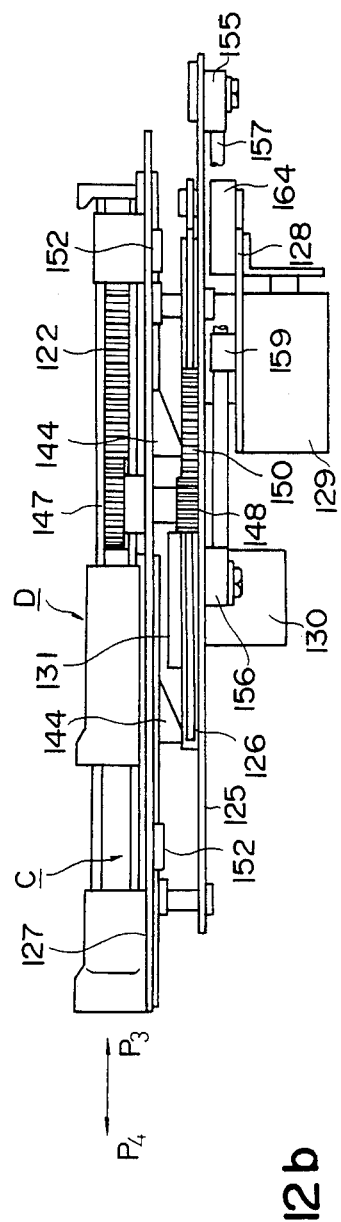
Figure 12C:
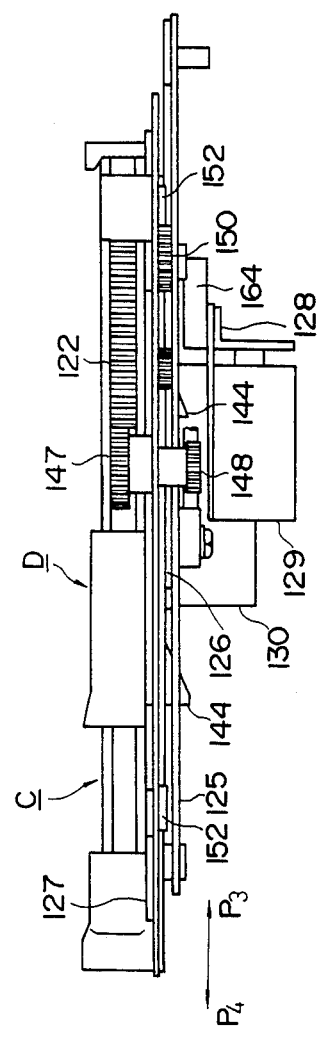

As the microswitch 169 is turned on, the feed loading motor 132 is switched on through an operation of an unillustrated control circuit and the rotation of the feed loading motor 132 is transmitted to the feed loading pinion 166 through the gear train 167. The rotation of the pinion 166 causes the feed loading rack 160 which is in mesh with the pinion 166 to be moved in the direction of arrow P3 and the head base 128 thereby is moved in the same direction. The movement of the head base 128 in the direction of arrow P3 causes the rear edge of the head base 128 to push the carrier pin 174 in the direction of arrow P3 thereby moving the carrier 126 in the direction of arrow P3. As the carrier 126 is moved in the direction of arrow P3, the carrier pinion 148 which is in mesh with the rack 150 is rotated and the loading pinion 147 is simultaneously rotated. The rotation of the loding pinion 47 causes the disc cartridge case C to be moved in the direction of arrow P3 as shown in FIG. 12b. As the disc cartridge case C is moved and the disc 121 housed therein approaches the region above the turntable 131, the cams 144, 144 ... of the holder 127 gradually enter the openings 145, 145 ... of the carrier 126 and the openings 146, 146 ... of the chassis 125 and the holder 127 thereby is moved downwardly. As the holder 127 is moved downwardly, the turntable 131 enters in a relative movement into the disc cartridge case C through an opening (not shown) formed in the disc cartridge case C and holds the disc 121 housed in the case C. At this time, the disc 121 is disposed in a space between the disc stabilizer 124 of the case C located above the central portion of the disc 121 and the turntable 131 located beneath the central portion of the disc 121 and is held securely between the disc stabilizer 124 and the turntable 131 with the aid of magnetic attraction between the magnet mounted on the turntable 131 and the disc stabilizer 124 of magnetic substance. When the holder 127 has reached its lowermost position (the playback position of the disc 121) as shown in FIG. 12c, the carrier pinion 148 is disengaged from the rack 150 and the rotation of the loading pinion 147 thereby is stopped.

In the above operation, the holder 127 having reached its lowermost position is held in position by the coil springs 142, 142 ... in association with the magnetic attraction generating means. More specifically, the holder 127 is held on the carrier 126 by the urging force of the coil springs 142, 142 .... In addition, the magnets 152, 152 ... fixedly secured to the holder 127 attract the chassis 125 by the formation of the magnetic circuit through the magnets 152, the holder 127 and the chassis 125 thereby holding the holder 127 in position. Thus, the holder 127 is clamped in its lowermost position by the coil springs 142, 142 ... and the magnetic attraction generating means. In particular, the magnetic attraction increases in inverse proportion to the square of relative distance so that the magnetic attraction generating means imparts a sufficient force to clamp the holder 127 and effectively prevents an undesired vertical movement of the holder 127 even when vibration is applied from the outside of the device.

When the loading operation of the disc cartridge case C has been completed, the head base 128 is moved to the rear end portions of the guide bars 157, 157. At this time, the photo-coupler 168 detects passing of the side edge b of the opening 162 formed in the slit plate 163 and thereby detects completion of the loading operation. Upon detection of the completion of the loading operation by the photo-coupler 168, the motor 132 is reversely rotated and the head base 128 starts movement in the direction of arrow P4. Since the head base 128 is not engaged with the carrier 126 at this time, the carrier 126 is not moved in association with the head base 128. The head base 128 only is moved and the optical pickup head 129 reaches the lead-in position of the disc 121. Thereupon the photo-coupler 168 detects passing of the rear edge a of the slit plate 163 and the motor 132 thereby is stopped and the head base 128 stops its movement.

The disc playback device is now in a state in which the disc 121 can be played back. When a playback command is given to the device, the disc driving motor 130 is rotated to turn the disc 121 with the turntable 131. In the meanwhile, the feed loading motor 132 which provides driving force for the feed operation causes the head base 128 to start to move in the direction of arrow P3. A signal reading section of the optical pickup head 129 on the head base 128 reads a signal recorded on the disc 121 through a laser beam inlet (not shown) formed in the disc cartridge case C whereby the playback of the disc 121 is performed.

When the signal reading section of the optical pickup head 129 has read a lead-out position signal recorded on the disc 121, or the photo-coupler 168 has detected passing of the edge b of the opening 162 formed in the slit plate 163, or an eject command has been given to the device, the feed loading motor 132 causes the head base 128 to move further in the direction of arrow P3 in an overstroke movement. In the course of the overstroke movement of the head base 128 in the direction of P3, the engaging hook 164 mounted on this head base 128 comes into abutting engagement with the pin 175 on the chassis 125 and is pushed and rotated by the pin 175 into engagement with the carrier pin 174 of the carrier 126. When the head base 128 has further moved to an end position of the overstroke movement, the photo-coupler 168 detects passing of the edge c of the slit plate 163. Upon detection by the photo-coupler 168 of the end position of the overstroke movement of the head base 128, the feed loading motor 132 is reversely rotated and the head base 128 is moved in the direction of arrow P4 with the carrier 126 hooked by the engaging hook 164. Thus, the disc cartridge case C is returned to its initial position in the reverse order to the loading operation. In the vicinity of the end point of the reverse movement, the engaging hook 164 abuts against the pin 176 on the chassis 125 and is pushed and rotated thereby into disengagement from the carrier pin 174 of the carrier 126. In the end point of the reverse movement, the pin 173 of the carrier 126 engages with the actuator 172 of the microswitch 169. Thus, all component parts of the device are returned to their initial state whereby the eject operation is completed.

In the upward movement of the holder 127 during the eject operation also, the magnetic attraction clamping the holder 127 decreases in inverse proportion to the square of relative distance and, accordingly, once the holder 127 starts to move away from the chassis 125, the holder 127 can subsequently be released readily from the chassis 125.

What is claimed is:

1. A disc centering device for a disc playback device comprising:
   a turntable having a disc mounting portion and at least three recesses provided thereon substantially concentric to the center of the turntable;
   a disc motor shaft connected to said turntable;
   at least three disc centering members provided in the respective recesses of said turntable substantially concentrically with said disc motor shaft and each having a surface facing radially outwardly and vertically with respect to the turntable and each slidably disposed in each of the recesses of the turntable, wherein the centering members are separately slidable in the radial direction of said turntable to engage a central opening of a disc with the vertical surface of each centering member pushing in a normal direction against the periphery of the central opening of the disc; and
   urging means provided in said turntable for urging said centering members radially outwardly of said turntable.

2. A disc centering device as defined in claim 1 wherein each of said centering members has a taper portion formed with a tapered surface which is positioned substantially concentric with said disc motor shaft.

3. A disc centering device for a disc playback device comprising:
   a turntable having a disc mounting portion;
   a disc motor shaft connected to said turntable;
   at least three disc centering members provided in said turntable substantially concentric with said disc motor shaft and separately moveable in the radial direction of said turntable to engage a central opening of a disc, each of said centering members having a taper portion formed with a tapered surface which is positioned substantially concentric with said motor shaft; and
   urging means provided in said turntable for urging said centering members radially outwardly of said turntable, wherein said turntable includes a center spindle portion having a tapered surface formed substantially concentric with said disc motor shaft and engaging the central opening of the disc which is guided along this tapered surface and wherein said tapered surface of each of said centering members is arranged so as to form an imaginary cone-like tapered surface in association with said tapered surface of said center spindle portion for guiding the disc along this imaginary cone-like tapered surface to a position in which the disc is placed concentrically with said disc motor shaft.

* * * * *